Dec. 17, 1929.     H. ISOBE     1,740,351
DEHYDRATING SUBSTANCE
Filed July 25, 1924

Inventor
H. Isobe
By Marks & Clerk

Patented Dec. 17, 1929

1,740,351

UNITED STATES PATENT OFFICE

HAJIME ISOBE, OF OCHIAI-MACHI, TOYOTAMA-GORI, JAPAN, ASSIGNOR TO ZAIDAN HOJIN RIKAGAKU KENKYUJO, OF TOKYO, JAPAN

DEHYDRATING SUBSTANCE

Application filed July 25, 1924, Serial No. 728,257, and in Japan February 1, 1924.

This invention relates to a process of promoting vapor adsorbing property of colloidal substances, natural or artificial, consisting in mixing the substances with 0.5% to 30% of calcium chloride, by treating the substances with water solution of calcium chloride or first mixing the substances with the chloride and then treating the mixture with water, so that the adsorbing surface of the substances contain from 0.5% to 30% of calcium chloride. The object of the invention is to cause calcium chloride to adsorb or chemically take of the moisture which is adsorbed or physically taken up by colloidal substances, so that the increase of vapor pressure of the adsorbing surface of the substances is prevented and as a result the pressure difference, which initially exists between the adsorbing surface of the substances and the vapor itself contained in air or other gases, will be maintained and thereby the adsorbing power of the surface is prevented from decreasing. Therefore any colloidal substance, natural or artificial according to the invention has a greater adsorbing power and can adsorb an increased amount of vapor in a shorter period of time.

Figure 1:
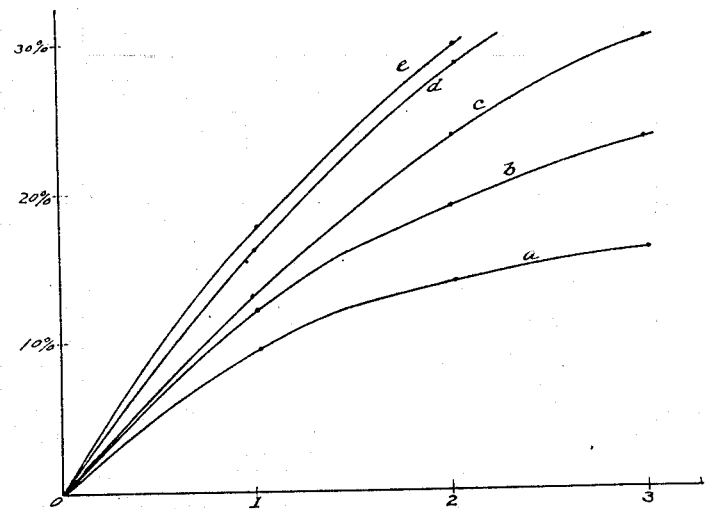
Figure 2:
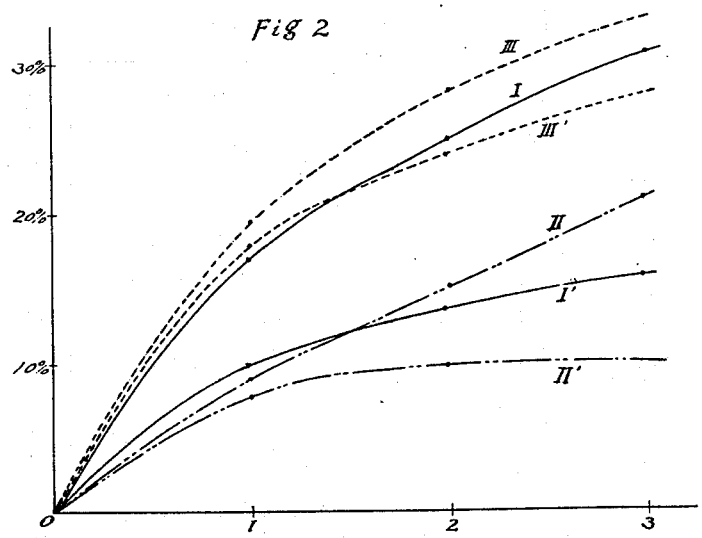

In the accompanying curves, Fig. 1 shows the change of adsorbing speed of acid clay taken for an example and containing various percentages of calcium chloride in its adsorbing surface, Fig. 2 shows adsorbing speeds of various colloidal substances all containing 10% of calcium chloride in their adsorbing surfaces.

The colloidal substances in this invention cover all of the class such as acid clay, fuller's earth, Florida earth, bog iron, bauxite etc. for natural substances; and colloidal silica, colloidal alumina, exchange silicate etc. for artificial substances. It is well known that although these substances adsorb vapor very rapidly at first, the speed of adsorbing is soon retarded. The reason of this retardation of the adsorbing speed of the substances is that the difference of vapor pressure between the adsorbing surface of the substances and vapor itself in the air or gases soon diminishes as the substances adsorbs a certain amount of vapor. Therefore, in order to let the substances adsorb vapor until these substances are saturated, a considerable length of time for the adsorption is needed. The object of the invention is to obviate such defect by keeping the difference of the vapor pressures at its initial state.

When the substance adsorbs vapor, the vapor pressure of the surface thereof suddenly increases. According to this invention, in order to again diminish such vapor pressure of surface of the substance, calcium chloride, a chemical adsorbing agent of the moisture, is adsorbed by or deposited in the same surface, whereby the vapor adsorbed by surface of the substance is absorbed or taken up by calcium chloride.

For instance, when acid clay is kneaded together with an equal quantity of water solution of calcium chloride, pressed out through a perforated plate and is dried at the temperature of 200° C., the adsorbing power is increased according to the concentration of the solution. Fig. 1 shows various examples of adsorbing speed of acid clay treated as above, and in which ordinate is percentage in weight of vapor adsorbed and abscissa is hours required. In this figure, $a$ is a curve when no calcium chloride is used. $b$ is a curve for the solution containing 1%, $c$ 10%, $d$ 20% and $e$ 30%. As is to be seen, the effect of calcium chloride can be seen even when 0.5% is contained in the clay, viz, the clay is treated with 0.5% water solution of calcium chloride, and this effect reaches maximum at a certain content, while it begins to decrease at a percent near 30. The reason of this is supposed to be that when acid clay contains an amount of calcium chloride beyond a certain limit, the nature of the mixed substance approaches that of calcium chloride alone rather than that of acid clay itself, and such calcium chloride gradually dissolves in water adsorbed so that the mixed substance can not keep its form as originally prepared and melts down. Therefore in this invention the limits of the calcium chloride content is taken from 0.5% to 30%. Of course, the mixed substance can be repeatedly used after driving off the saturated vapor at a temperature, say 200° C. Also the same result can be obtained by first mixing acid clay with calcium chloride and treating the mixture with water.

From the foregoing, one can easily understand that when acid clay is treated with equal quantity of 20 or more percent solution of calcium chloride, that is, when it is admixed with 10% or more of the chloride, the time required for adsorbing vapor is diminished to a fraction of that required when acid clay is treated with mere water, and accordingly the capacity of an apparatus required for drying air or for collecting vapor of volatile gas contained in permanent gas is greatly diminshed. Also similar effect is obtained for all colloidal substance other than acid clay.

Fig. 2 shows speed curves of various colloidal substances treated with 10% water solution of calcium chloride, and in which I is a curve for acid clay, II bog iron, III artificial colloidal silica, all treated with the same solution. For comparison, I' shows a curve for acid clay alone, II' bog iron only, and III' artificial colloidal silica only, i. e., all free of calcium chloride.

I claim:

1. An adsorbent for water vapors comprising an inorganic colloidal adsorbent material containing 10 to 20 percent of calcium chloride.

2. An adsorbent for water vapors comprising a naturally occurring inorganic colloidal adsorbent material containing 10 to 20 percent of calcium chloride.

3. An adsorbent for water vapors comprising an adsorbent acid clay containing 10 to 20 percent of calcium chloride.

In testimony whereof I affix my signature.

HAJIME ISOBE.